April 13, 1937.  C. P. TEEPLE  2,076,798
METHOD OF AND APPARATUS FOR USE IN PREPARING METALLIC SHREDS
Filed Aug. 4, 1933    2 Sheets-Sheet 1
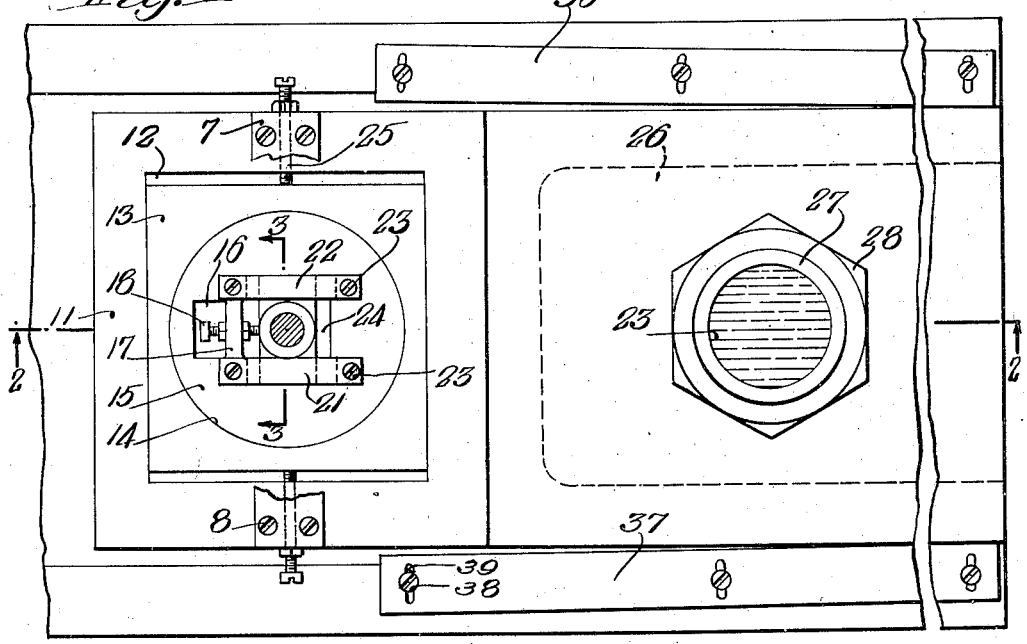
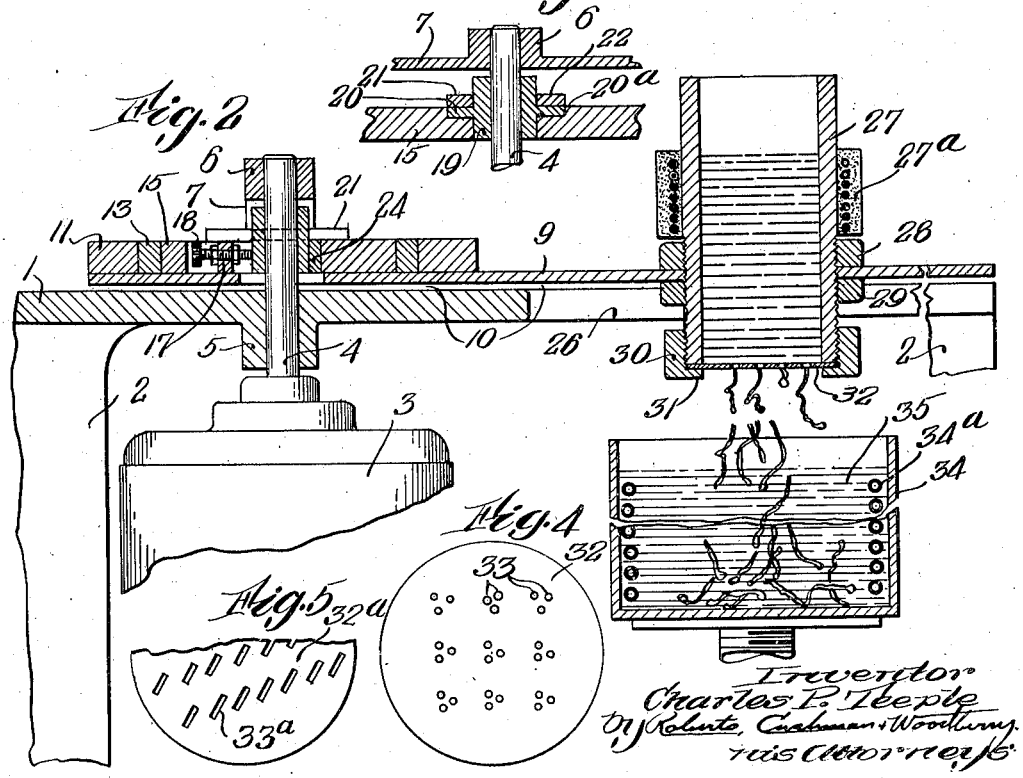

April 13, 1937. C. P. TEEPLE 2,076,798
METHOD OF AND APPARATUS FOR USE IN PREPARING METALLIC SHREDS
Filed Aug. 4, 1933 2 Sheets-Sheet 2

Inventor
Charles P. Teeple

Patented Apr. 13, 1937

2,076,798

UNITED STATES PATENT OFFICE 2,076,798

METHOD OF AND APPARATUS FOR USE IN PREPARING METALLIC SHREDS

Charles P. Teeple, Cambridge, Mass.

Application August 4, 1933, Serial No. 683,641

9 Claims. (Cl. 83—91)

This invention pertains to a method of preparing metallic shreds and to apparatus for use in the practice of said method. Shreds of metal such as result from the practice of my improved method are of utility for various purposes in the technical arts, but for specific example I will refer to their use in the manufacture of so-called "plastic packing".

Plastic packing is now commonly employed in the stuffing boxes of pumps, compressors, engines, and other mechanisms having moving rods, stems, plungers, or shafts, to form a seal designed to prevent leakage of fluid along the rod, shaft, or the like. Plastic packing is usually composed of an intimate mechanical mixture of bearing metal in the form of small shreds or particles with fibrous material, for example, asbestos, and flaked or powdered graphite, together with a suitable lubricant-binder. Such plastic packing is characteristically different from other packings in that it is easily divided by the hands into portions of appropriate size, which may be molded to fit and fill a stuffing box cavity of any size or shape. In order to avoid undue friction loss and to prevent rapid wear of the packing material, it is very desirable that the metallic elements of the packing consist of a good bearing metal, the properties of such metal being well known to those skilled in the art.

The metal commonly used in such packings is in the form of powder, granules, chips, shavings, fine wire, turnings, or thin ribbons of metal foil chopped into short lengths, the latter being the form at present most popular. However, all such prior forms of metal are subject to certain limitations and disadvantages. Thus the production of the narrow metallic ribbons which are now commonly employed is involved and expensive, necessitating the melting of the selected alloy, casting it into ingots, rolling it into foil, cutting up the foil into ribbons of suitable width, and then chopping these ribbons into short lengths. Not only is this process expensive, but it places a limitation upon the type of material employed, and since the metals having the best bearing properties are not easily rolled into foil, it has been necessary to employ metal which does not possess the best anti-friction qualities, and which often wears rapidly and lacks resistance to corrosion. A typical composition commonly for use in making such ribbons as above referred to, comprises approximately 98% lead, 1½% tin, and ½% antimony. However, from the standpoint of bearing qualifications, the proportions of tin and antimony should be substantially greater.

The production of metallic wire for use in plastic packings is subject to substantially the same limitations as the ribbon-like strips, and neither of these forms has any inherent tendency to cling or attach itself to the asbestos or other fibrous material.

While turnings and shavings are better in some respects, particularly their ability to cling to each other and to the other fibrous constituents of the packing, they must be prepared by a slow and expensive cutting process; they are of non-uniform character; and they are difficult to mix properly with the other ingredients of the packing.

Furthermore, metal in the form of powder or granules has no bonding power, such as to lock the fibrous material together and thereby prevent the latter from being blown out through the clearance between the shaft or rod and the gland when subjected to high pressure, and moreover, in all of the above forms, the metal tends to separate out from the other constituents of the packing, due to differences in specific gravity, thus resulting in a packing of non-uniform character.

My improved process as herein disclosed, permits the use of metals varying in character and/or composition through a substantial range, and thus the metallic element of the packing may have such bearing qualities as are well adapted to the intended use. Moreover, in accordance with my method, the metallic shreds may be varied in shape and size as well as in other characteristics in order that they may best cooperate with the other ingredients of the packing, and may best accommodate the packing to the intended conditions of use, for example, to the degree of pressure to which the packing is to be subjected. Thus, for example, the metallic shreds may have a very curly or kinky form; they may be of any desired length; they may each comprise a plurality of fingers or tentacles of any desired shape and length; the surfaces of the individual shreds may be smooth or roughened, as for example by etching; the shreds may be of round or other cross-sectional contour; and the shreds may have knobs at one end or at intermediate points.

Briefly stated, my improved method of preparing these metallic shreds consists in pouring the molten metal, while at a predetermined temperature, through a sieve or perforated plate having openings of predetermined size and contour, and catching the resultant fine streams of metal in a liquid cooling bath,—carefully determining the distance through which the metal falls before reaching the cooling medium, and also carefully regulating the temperature and character of the cooling medium in accordance with predetermined and experimentally proven data. For some desired effects the sieve or perforated plate is moved or shaken while the metal is flowing through its perforations, and this movement may be in one direction, or concomitantly in a plurality of directions, in accordance with the characteristics desired. Likewise, by the use of a proper cooling medium, for example, brine or weak acid, the surfaces of the metallic shreds may be etched and roughened to any desired extent.

Since the process is applicable to a wider range of metals than prior processes known to me, it is possible to provide shreds of metal having the desired bearing qualities appropriate to the intended use, and since the resulting shreds may be curly, twisted, or otherwise inherently capable of clinging to each other and to the asbestos or other fiber, a very effective and homogeneous packing, strongly reinforced and strengthened by the included metallic shreds, may be made by the employment of the product of this process, it being noted that in accordance with this method a single manipulation of the metal is all that is necessary in order to convert it from the molten form into the finished product.

In the accompanying drawings, wherein I have illustrated by way of example one desirable apparatus for use in carrying out my improved process, together with the mode of operation thereof and certain resultant products, Fig. 1 is a fragmentary plan view of a single form of my shred-producing apparatus;

Fig. 2 is a fragmentary vertical section substantially on the line 2—2 of Fig. 1;

Fig. 3 is a fragmentary section on the line 3—3 of Fig. 1;

Fig. 4 is a plan view of a perforated plate or screen forming a part of the apparatus;

Fig. 5 is a fragmentary plan view of a plate similar to that of Fig. 4, but with perforations of different shape;

Figure 12:

Figs. 6 to 11 inclusive are views illustrating various shredded metal products which may result from the practice of my process; and Fig. 12 is a section through a mass of plastic packing comprising my improved metallic shreds.

Referring to the drawings, I have illustrated one embodiment of my shred-forming apparatus as comprising a table having a substantially horizontal top 1 supported upon legs 2. Below the table is a motor 3 having a vertical shaft 4 which projects up through an opening in the table top 1, the latter being furnished with a downwardly directed bearing boss 5 forming a lower bearing for the shaft. The upper end of the shaft may be arranged to turn in a bearing 6 carried by a bridge member 7, secured by screws or bolts 8 to the table.

An elongate horizontal plate 9 is disposed just above the top of the table, such plate preferably being supported upon anti-friction balls (not shown) which permit the plate to be moved parallel to the table, and in substantially any direction, without undue friction. A second plate 11, preferably somewhat thicker than the plate 9, is mounted upon the upper surface of the latter, as shown in Figs. 1 and 2, and may be secured to the plate 9 in any desired manner. This plate 11 has a substantially rectangular opening 12 therein, and within this opening is arranged a rectangular block 13. This block 13 constitutes what may be termed an eccentric strap, being furnished with a circular opening 14, which receives a disk 15 which normally constitutes an eccentric. This disk has an elongate substantially rectangular opening 16 which is bridged near one end by a transverse web member 17. This transverse web member is provided with an opening in the plane of the disk for the reception of an adjustable set screw 18, preferably furnished with lock nuts at each side of the web member 17.

A sleeve 19 is fixed to shaft 4, for example by means of a pin, and this sleeve has a lower portion disposed substantially in the plane of the disk 15. This sleeve also has oppositely projecting wings 20 and 20ª seated in slots in the upper surface of the disk 15, thus compelling the disk to turn with the shaft. Strap members 21 and 22 overlie and confine the wings 20 and 20ª respectively, and are secured at their opposite ends by screws or bolts 23 to the disk 15. A spacer block 24 of predetermined thickness is interposed between the sleeve 19 and that end of the opening 16 which is remote from the set screw 18, such spacer block 24 being of such selected thickness as to offset the center of the disk 15 from the axis of the shaft 4 to an amount corresponding to the desired eccentricity of the disk. A set of spacer blocks of graduated thickness may be provided. After inserting a selected block, the set screw 18 is screwed up tight against the sleeve 19. Due to the eccentric position of the disk, as determined by the thickness of the block 24, rotation of the shaft will cause movement of the eccentric strap or block 13. This block 13 is preferably of less transverse width than the opening 12 in the member 11, but fits snugly within this opening at its right and left ends, as viewed in Fig. 1. Thus any movement of the block 13, due to the eccentricity of the disk 15, will cause longitudinal movement of the member 11, and consequently of the member 9, but if the space at opposite sides of the block 13 exceed the eccentricity of the disk, no transverse movement will be imparted to the member 11. However, the member 11 is furnished with a pair of set screws 25 which may, if desired, be screwed up against the lateral edges of the member 13, as shown in Fig. 1, thereby to prevent any relative lateral movement of the members 11 and 13. Under such circumstances rotation of the disk 15 will cause both lateral and transverse movements of the plate 9.

The table 1 is furnished with an elongate opening 26 near its right-hand end, as viewed in Fig. 1, and at that part of the plate 9 which bridges this opening the plate is furnished with an aperture for the reception of a hopper, crucible, or container 27 designed to receive the molten metal. If desired, this hopper or crucible may be furnished with a heating element, for example, an electric resistance coil 27ª adapted, if desired, to furnish heat for melting the metal, or at least to keep the metal at the proper temperature while the shreds are being formed. This hopper or container is held in proper position in the aperture in plate 9 by means of collars 28 and 29, which, if desired, may have screw-threaded engagement with the container, or may be pinned or otherwise attached thereto. The container 27 is normally open at its upper end and at its lower end is furnished with a collar 30 which may have screw-threaded engagement with the lower part of the container, such collar having a flange 31 adapted to hold a screen or perforated plate 32 in position at the lower end of the crucible. This plate is provided with openings of any desired shape, size and arrangement. The openings 33 in the plate 32 of Fig. 4 are circular and disposed in groups of three. However, as illustrated in Fig. 5, the plate 32ᵃ is provided with openings 33ᵃ of elongate substantially rectangular contour, and it is contemplated that a set of interchangeable plates having openings of different size, shape and/or arrangement may be provided for use in producing metallic shreds having different characteristics and for different specific purposes.

Below the crucible I arrange a receptacle 34 adapted to hold a fluid cooling medium indicated at 35. This cooling medium may be water, oil, weak acid, brine, or conceivably a gas or vapor, or in fact any suitable substance which has been found by experience or otherwise to produce the desired results. Preferably this receptacle 34 is arranged for vertical adjustment so as to determine the distance between the upper surface of the cooling fluid and the screen or perforated plate 32, since I find that this distance is of material importance in securing the results which I wish to obtain.

For guiding the plate 9 in its movements, I preferably provide a pair of gibs 36 and 37 secured to the upper surface of the table 1 by means of bolts 38 passing through elongate slots 39 in the gibs. If the plate 9 with the crucible 27 is to have a simple rectilinear movement, the gibs 36 and 37 may be disposed in substantially parallel relation so as to form guides for constraining the plate 9 in its movement, as imparted by the eccentric disk 15. On the other hand, if the plate 9 is to be given a compound movement, comprising both longitudinal and transverse components, the gibs 36 and 37 may be swung apart, as indicated in Fig. 1, so as to permit points in the plate 9 to move in a curvilinear path having components in directions at right angles to each other.

In carrying out my process on a soft bearing metal, for example a lead-base alloy containing approximately 85% lead, 10% tin, and 5% antimony, my preferred procedure would be substantially as follows:—The alloy is melted in a gas-fired crucible furnace or by other suitable means, or within the container 27 if provided with suitable heating means, and when at a temperature of between 800° and 825° F. is allowed to flow out in fine individual streams through the holes in the bottom plate 32 of the container. Such holes may for this purpose be of the order of 0.03 inch in diameter, for example. Preferably a fluid head of approximately 2 inches of metal is kept in the container 27 during the pouring operation. When herein I refer to the head of fluid metal above the orifice as of the order of two inches I do not intend thereby to limit myself exactly to two inches, since it may not be convenient as a practical matter to keep an absolutely unvarying head of metal during the operation. While my experiments seem to show best results when the fluid head is approximately two inches, it is possible to obtain a certain percentage of shreds of the desired character even though the head vary between one and seven or eight inches, for example. Thus while herein I refer to a head of the order of two inches, I intend to include in such term the range just indicated, with the understanding that a two inch head is preferred. Preferably the plate 32 is adjusted to a distance of about 2 inches above the surface of the cooling medium in the tank 34, the depth of such cooling medium for good results preferably being ten inches or more. The temperature of this cooling medium is kept at between 170° and 180° F., and if the temperature tends to rise substantially during the pouring operation the liquid may be cooled by circulating a cooling fluid through coils 34ᵃ in the receptacle 34, or by withdrawing the fluid from the receptacle 34 and circulating it through a suitable cooler and then passing it back into the receptacle. The metallic shreds as formed may be removed from the receptacle 34 by means of a suitable implement, or if desired a wire basket may be arranged in the receptacle 34 within which the shreds are formed and accumulate, and by means of which they may be removed from the receptacle. While I have referred to a lead-base alloy as the metal to be employed, I contemplate that other metals or alloys may be treated in a similar manner, for example, that un-alloyed lead may be used, and that copper-base alloys or copper alone may be found useful.

Since vibration of the perforated plate is not necessary for the production of shreds of certain desirable types, the apparatus may be so simplified as to omit the vibrating devices, if desired, it being merely necessary, in such event, to provide for supporting the container in any appropriate way at the proper distance above the cooling bath.

I have found that shreds of substantial length and approximately uniform character may be obtained when the perforated plate is set at distances varying between ¼ inch and 7 inches above the surface of the cooling fluid. The length of the resulting shreds bears an inverse though not necessarily proportional ratio to the distance between the plate and the quenching or cooling medium. When this distance is of the order of ¼ inch, shreds of substantially unlimited length may be obtained and such shreds may be used in forming a wholly metallic packing if desired, as well as for other purposes. On the other hand I have observed that if the distances between the perforated plate and the cooling medium be gradually increased beyond an amount of the order of 7 inches, for example, dependent somewhat on the temperature of the metal,—a greater and greater proportion of the metal which is delivered from the perforations in the plate tends to break up into small irregular particles instead of forming elongate shreds of more or less uniform dimensions. While my observations seem to indicate that the height of fall of the metal is best kept below 7 inches, I do not wish to be limited to this exact distance as a maximum, but only refer to it as indicative of the general order of distance, which under conditions which I have employed, seems to approximate the practical limit. Thus when I refer to a distance of the order of 7 inches, I intend to include somewhat greater or lesser distances. In accordance with the present invention, therefore, the distance between the screen and the water is so critically chosen that the streams of molten metal reach the surface of the liquid so as to be cooled and solidified before surface tension can cause the fluid metal stream to be constricted and thus separate into small irregular droplets or granules. For most conditions, I have observed a distance of approximately 2 inches to give good results.

I have found that the temperature of the molten metal at the time of pouring may be between 50° and 500° F. above the melting point of the particular metal, the higher the temperature of the metal the greater the tendency for it to separate as it falls and assume granular form. In lead-tin-antimony alloys, a temperature of about 810° F. has been found quite suitable, particularly when the metal is quenched in warm water, that is to say, water of about 175° F. The resulting shreds then have the desired physical properties, being very ductile and of the desired shape.

While water at the temperature just mentioned is desirable, it is possible to get shreds suitable for some purposes if the water be cold, but the resulting shreds are substantially straight and less ductile. The upper limit of the temperature of the quenching bath is set by the point at which the molten streams of metal on entering the liquid are no longer quickly cooled below their solidification point. With a metal temperature of 800° this limit is apparently about 190° F., while a quenching temperature of 130° imparts a very slight kink or curl to the shreds, and a temperature of 175° F. produces a very pronounced curl.

A reasonable explanation of this phenomenon, particularly when the container for the molten metal is kept stationary, is that with cold water the large temperature gradient existing between the metal and liquid causes very rapid dissipation of heat from the metal so that the streams are almost instantly solidified upon striking the liquid. On the other hand, when the water or other quenching liquid is at a high temperature, so that a smaller temperature difference exists between the liquid and the metal, solidification of the metal does not take place instantaneously on contact, but is delayed until the metal has traveled downwardly through the liquid a short distance. Under these conditions the impact upon the liquid, unequal cooling stresses set up in the metal, the buoyant force of the liquid and/or other unknown factors, produces a distortion of the shreds before they harden, thus resulting in a curled or twisted formation of the shreds. When the container is vibrated, it doubtless imparts a wavy character to the flowing stream, and the latter is cooled so quickly as to retain some of the wavy outline.

While water is desirable as a cooling medium under most circumstances, other non-inflammable, non-explosive quenching fluids, as above suggested, may be used, such as oil, glycerin, brine, weak acids, etc., but in most cases I prefer water, since it is cheap and does not necessitate washing or rinsing of the shreds after their formation.

In forming shreds of special type, such as those having excessive curl or having a large number of branching tentacles, the plate 32 may have its holes arranged in groups of two or three very closely spaced, as shown in Fig. 4, each group being separate from the next group by a wider space. Then by vibration of the plate, the grouped streams are caused to stick together at intervals, resulting in crab-like or spider-like particles each having a number of curved claws or legs. For making such special forms of shreds I have found vibration frequencies of from 900 to 2800 per minute with an amplitude of from 0.810 to 0.005 inch to be quite useful. In general, the higher amplitudes are used with the lower frequencies, and vice versa.

For most purposes, the container 27 may be left stationary during the pouring of the metal. This may be accomplished either by stopping the motor or by setting disk 15 concentric with shaft 4. The character of the shreds varies very greatly, as already noted, with the temperature of the molten metal, the temperature of the cooling bath, the character of the latter, the distance between the perforated plate and the surface of the cooling medium, and the rapidity of vibration and the amplitude of vibration imparted to the crucible. Figs. 6 to 11 inclusive, illustrate some of the resulting products.

Figure 6:
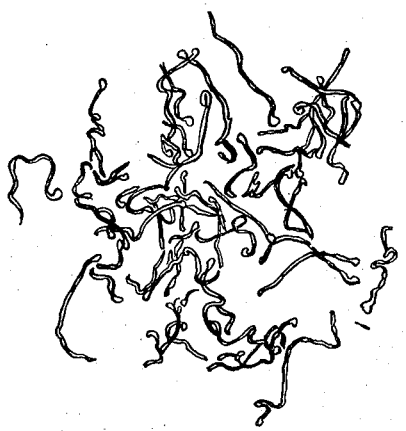

Thus the shreds illustrated in Fig. 6, and which for many purposes I prefer, were made from metal kept at a temperature of substantially 810° F., which was allowed to drop through a distance of 2 inches into water kept at a temperature of approximately 172°. Inspection of this figure will shown that these shreds are of substantial length, averaging approximately 1½ inches, each shred ordinarily having a small knob or ball at one end and being very much curled and twisted. By reason of their curliness, the shreds tend to cling to each other and also to cling very firmly to the asbestos fiber when incorporated therewith in making the plastic packing. Due to their considerable length, these shreds act as reinforcers for the packing so as to keep the packing from blowing out, and they do not tend to separate out from the remainder of the packing materials, so that a homogeneous packing is assured.

Figure 7:
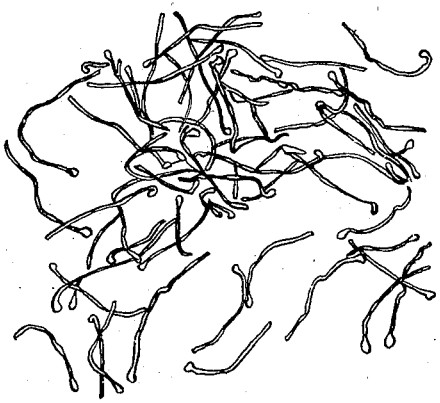

Referring to Fig. 7, a further form of shred is illustrated, these shreds being somewhat longer on the average than those of Fig. 6, while the tail portions of the shreds are somewhat thinner than those of the shreds of Fig. 6. These shreds of Fig. 7 are produced by allowing the metal, kept at substantially 810° F., to drop through approximately 2 inches into water kept at about 135° F. It may be noted that the distinction between the shreds of Figs. 6 and 7 is due solely to differences in temperature of the cooling medium.

Figure 8:
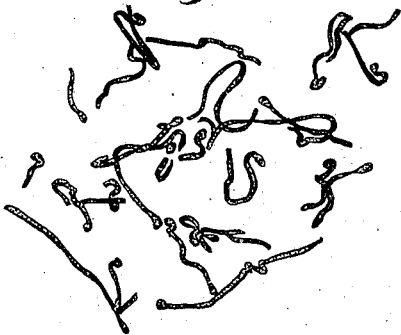

Referring to Fig. 8, the shreds illustrated are produced under the same conditions as those of Fig. 6, except that the cooling medium is a salt solution. The result of allowing the hot metal to drop into brine is to etch the surfaces of the shreds so that they are rough and absorb and hold oil, graphite, etc. better than smooth surfaced shreds, and also afford a greater grip upon the fibrous asbestos or other material of the packing than do the shreds of Fig. 6.

Figure 9:

In the arrangement shown in Fig. 9, it may be noted that the metallic particles, instead of consisting of a single wire-like piece of metal, are composed of a plurality of fingers or tentacles all integrally united. This product results from allowing the metal to flow through a group of openings in the sieve or plate while vibrating the latter, the openings being arranged, for example, as shown in Fig. 4, so that as the streams of metal flow from the openings of a group they coalesce before striking the cooling medium, thus producing the crab-like forms which are very well adapted to obtain a secure grip upon each other and upon the asbestos fiber.

Figure 10:

Fig. 10 illustrates the result of a slightly different procedure,—the perforated plate being stationary and the metal being supplied at approximately 1045° F. and allowed to drop through a distance of 2 inches into water at substantially 163°. It may be noted that in this instance the individual shreds or particles are considerably shorter than those illustrated in Fig. 6, probably averaging approximately ½ inch in length. However, these particles are very much curled and twisted, and thus well adapted to retain a secure grip upon associated fibrous material.

Figure 11:
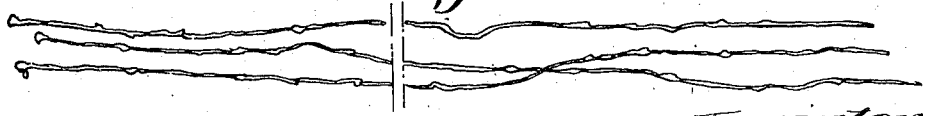

To illustrate the capabilities of this process in producing shreds of varying length, I have illustrated the result of a further modification of the process in Fig. 11. The shreds as illustrated in this figure were produced by causing metal at approximately 810° F. to drop through a distance of approximately ⅜ of an inch into water kept at substantially 170° F. It may be noted that by shortening the distance through which the melted metal falls, it is possible to make shreds of substantially unlimited length, although it should be noted that these shreds are usually characterized by the presence of small irregularities, such as knobs or thickened portions at intervals in their lengths. Such long shreds may, if desired, be produced in the manner just described and then chopped up into shorter pieces of uniform length for use in packing. Such long shreds, for example, three to four feet in length, may be used without association with other fibrous material, being lubricated with oil or graphite, and loosely twisted into skeins of appropriate and suitable size for use. I further contemplate that these long shreds, which apparently may be made of any desired length, may find other utilities in the arts.

In Fig. 12 I have illustrated a typical plastic packing comprising fibrous material, such as asbestos, and having incorporated therewith metallic shreds of the kind, for example, illustrated in Fig. 6. While such a packing has the characteristics desired in a plastic packing, that is to say, it may be separated into portions of desired size and may be moulded to conform it to the space in which it is placed, it may be made to possess all the desired bearing qualities by proper selection of the metal used in the shreds, and when once in place the shreds tenaciously hold the other materials in proper relative position, preventing them from blowing out, and by reason of their length and curliness, do not tend to separate out from the other materials when subjected to prolonged vibration.

While I have illustrated certain selected products of the process as indicating in general its possibilities, it is to be understood that the products illustrated in Figs. 6 to 11 inclusive, are by no means the only ones which may be produced by my method and apparatus, since, as above noted, variations in several factors, such as temperature of the metal, vibration of the container, temperature of the cooling medium, and the distance through which the metal flows, each affects the character of the product so that an almost limitless number of varieties of shred may be produced in accordance with this invention.

While I have here illustrated one desirable apparatus for use in the practice of my process, it is to be understood that the apparatus may be varied in different particulars, if desired, without departing from the spirit of the invention, and that sizes, shapes, and relative arrangement of parts are not to be regarded as limiting factors, but that any equivalents may be substituted and that any obvious mechanical changes may be made, all within the scope of the invention. While for convenience, I have referred to the resulting product as "shreds", I do not intend thereby to limit myself to any exact shape, but only to designate discrete particles of a size and character suitable for the intended use.

I claim:

1. Method of producing elongate ductile metallic shreds, which comprises heating a soft bearing metal to a temperature not exceeding 500° F. above its melting point, exuding the molten metal through a plate having openings of a diameter of the order of 0.03 inch, thereby to produce stringy shreds of molten metal, and quenching the exuding metal in a liquid bath while still in the form of stringy shreds and while at a temperature not less than its melting point, thereby to effect the solidification of the metal in the quenching liquid and to produce a mass of discrete metallic shreds of irregular twisted formation.

2. Method of producing elongate ductile metallic shreds useful in packing material, comprising heating a soft bearing metal to a temperature at least 50° F. above its melting point, and exuding the molten mass in the form of stringy shreds not exceeding 0.05 inch in diameter directly into a liquid quenching bath disposed at a distance not exceeding seven inches from the point at which it is exuded, thereby to effect the solidification of said metal during immersion in the bath and to produce a mass of discrete shreds of irregular twisted formation.

3. Method of producing elongate wavy metallic shreds of a ductile character, comprising heating a lead-tin-antimony alloy to a temperature substantially above its melting point, exuding the molten metal through a plate having apertures therein of the order of 0.03 inch in diameter, the plate being disposed at a distance between one-quarter inch and seven inches above the surface of a quenching bath while simultaneously vibrating the plate, thereby to exude wavy string-like shreds of the molten metal, and, while said shreds are at a temperature above the melting point of the metal, quenching them in a bath of liquid thereby to produce elongate strands of irregular wavy formation.

4. Method of producing elongate ductile metallic shreds suitable for use in packings, comprising heating a bearing metal to a temperature at least 50° F. above its melting point, exuding the molten metal through orifices of the order of 0.03 inch in diameter to form stringy shreds of molten metal, and conducting said shreds directly into a quenching liquid maintained at a temperature of the order of 175° F. and disposed at a level approximately two inches below said orifices thereby to effect the solidification of the metal in said liquid and the formation of irregular twisted shreds.

5. Method of producing elongate ductile metallic shreds for use in metallic packings, comprising heating a soft bearing metal to a temperature substantially above its melting point, exuding the metal in spaced groups of closely adjacent string-like shreds of the order of 0.03 inch in diameter, and imparting transverse vibratory movement to the shreds to cause the shreds of a group partially to coalesce and form clusters, and dropping said clusters while the metal is still molten through a distance of the order of two inches directly into a quenching liquid and before the surface tension has effected a contraction and separation of the shreds into spheroidal droplets thereby to produce clusters of united metallic shreds of irregular twisted formation.

6. Method of producing metallic shreds from an alloy containing a predominant proportion of lead, comprising heating said alloy to a temperature not less than 800° F. nor more than 850 degrees, exuding the molten alloy through orifices of a cross-sectional area of the order of 0.0007 square inch to form stringy shreds of molten metal, and conducting said shreds directly into brine maintained at a temperature of the order of 175° F. and disposed at a level approximately 2 inches below said orifices thereby to effect the solidification of said metal in said liquid and the formation of irregular twisted threads having etched surfaces.

7. Method of producing elongate metal shreds of irregular tortuous form comprising melting a lead-base bearing metal and heating the molten metal to a temperature of between 800° and 825° F., then exuding the metal through small apertures and allowing the metal to fall through a distance of the order of 2 inches in streams of approximately 0.0007 square inch in cross-sectional area directly into a quenching bath having a temperature of from 130° to 190° F. so that the metal enters the bath before the surface tension of the molten metal has effected a contraction and separation into spheroidal droplets and before the temperature of the metal has dropped to its solidification point, whereby the streams break into separate elongate shreds of an irregular twisted form.

8. Method of producing elongate metal shreds of irregular tortuous form comprising melting a lead-tin-antimony alloy and heating the molten metal to a temperature of the order of 810° F., then exuding the metal in small streams of the order of 0.03 inch in diameter under a head of the order of 2 inches of the molten metal and allowing the streams to fall freely through a distance of the order of 2 inches directly into a quenching bath having a temperature of the order of 175° F. so that the metal enters the bath before the temperature has dropped to the solidification point and before the surface tension has effected a contraction and separation of the metal into spheroidal droplets whereby the streams are caused to break into separate elongate molten shreds which assume an irregular tortuous form as they solidify in the quenching bath.

9. Packing material comprising a conglomeration of independent metallic shreds of a ductile bearing metal averaging one and one-half inches in length and predominantly characterized in having a small knob or ball at one end and a tail portion which is very much curled and twisted, the metallic shreds having a crystalline structure such as that which results from the sudden quenching of metal in a cooling bath, the shreds being irregular and unlike in contour and tending by reason of their curliness, to cling to each other and to any non-metallic material which may be incorporated with them.

CHARLES P. TEEPLE.